Sept. 9, 1941. J. P. QUAM Re. 21,898

LOUDSPEAKER

Original Filed April 3, 1935 2 Sheets-Sheet 1

Inventor:-
James P. Quam,
By Freeman L. Mueller Atty

Sept. 9, 1941. J. P. QUAM Re. 21,898
LOUDSPEAKER
Original Filed April 3, 1935 2 Sheets-Sheet 2
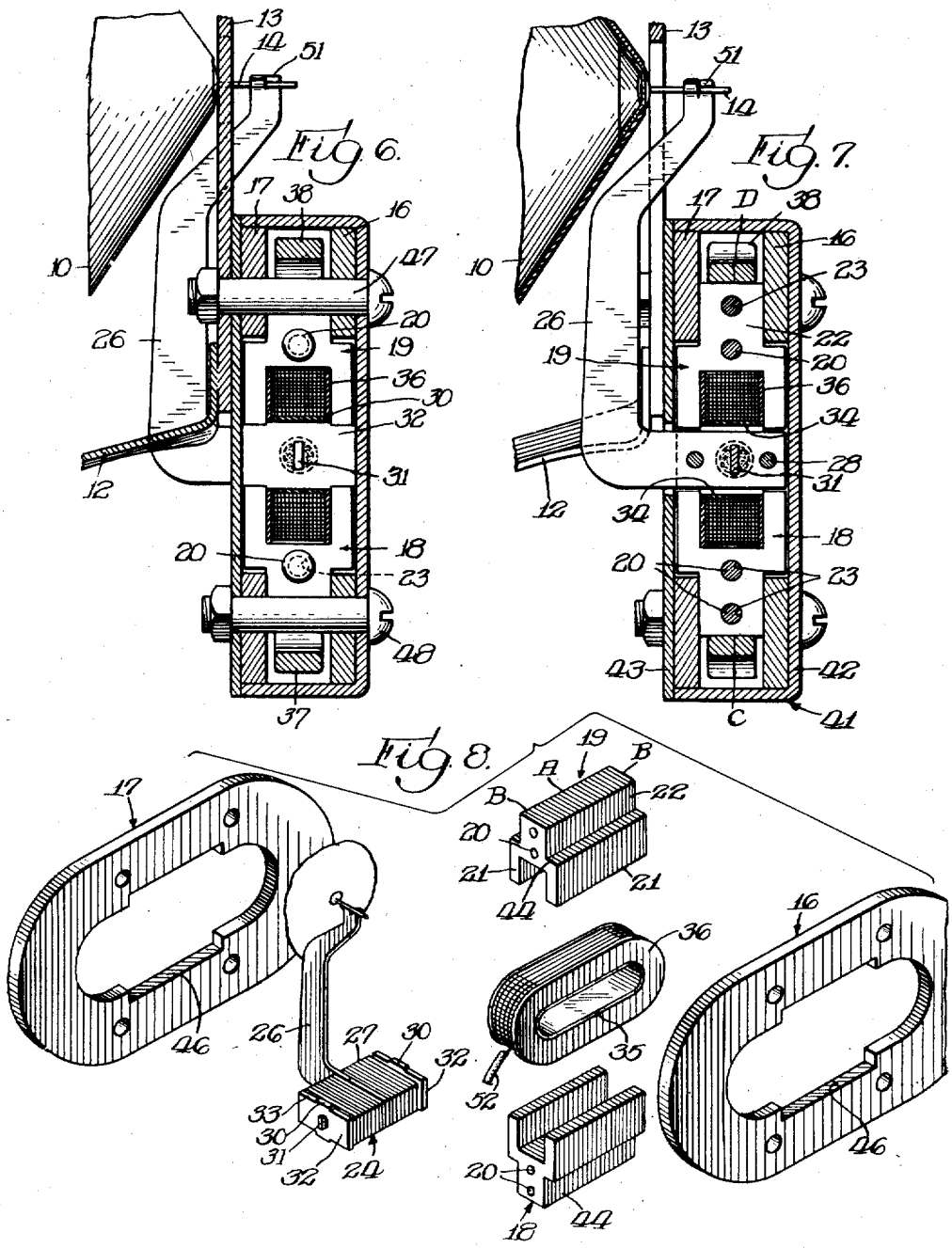
Inventor:-
James P. Quam,
By Foorman L. Mueller,
Atty.

Reissued Sept. 9, 1941

Re. 21,898

UNITED STATES PATENT OFFICE 21,898

LOUDSPEAKER

James P. Quam, Chicago, Ill., assignor to Quam-Nichols Company, Chicago, Ill., a corporation of Missouri Original No. 2,124,338, dated July 19, 1938, Serial No. 14,389, April 3, 1935. Application for reissue March 10, 1941, Serial No. 382,597

23 Claims. (Cl. 179—119)

My invention relates in general to loudspeakers, and particularly loudspeakers with the cone type diaphragm and a vibratory unit therefor, ordinarily known as a magnetic type speaker.

Difficulty is encountered in the present magnetic type loudspeakers in that it is not possible to obtain the volume or the faithfulness of reproduction over the entire band of frequencies obtained from the dynamic type loudspeaker. Chattering and distortion often develop when the speaker is operated at high volumes so as to impair reproduction.

A further disadvantage to the present magnetic type speaker, in comparison with a dynamic speaker, is the fact that it is less sturdy, and has a shorter life. Furthermore, it does not lend itself to shipment and handling as satisfactorily as the dynamic type.

It is an object of my invention to provide an improved magnetic type of loudspeaker.

A further object is to provide an improved vibratory unit for a cone type diaphragm loudspeaker.

It is also an object to provide a magnetic type loudspeaker which will faithfully reproduce at large volume a radio broadcast over substantially the entire band of frequencies.

One of the features of my improved driving unit is the provision of a laminated permanent magnet comprising closed ring-shaped body members, in which said laminations are punched out on a punch press.

An additional feature is the provision of a pair of laminated pole pieces adapted to carry a laminated armature and a field coil therebetween, with the three elements designed to be mounted between the laminations of the permanent magnet, as a frame for the elements.

A further feature of my invention is the provision of a vibratory unit for a loudspeaker which may be completely assembled and then quickly mounted directly on the usual frame support for the cone-shaped diaphragm of the speaker.

It is also a feature of my invention to provide a vibratory unit in which substantially all of the parts may be stamped out on a punch press, and then assembled with a very small amount of labor.

A still further feature is the provision of parts for the vibratory unit of such a nature that they may be shipped disassembled, and then readily assembled at the point of use for the loudspeakers without any complicated assembly lines or highly trained operators.

Other objects and advantages of my invention will be apparent from the following description taken with the drawings, in which:

Fig. 6 is a sectional view of the driving unit as mounted on the cone housing taken along the line 6—6 of Fig. 3.

Fig. 7 is a sectional view of the vibratory unit as mounted on the cone housing taken along the line 7—7 of Fig. 3.

Fig. 8 is a view of the driving unit, particularly the magnet, pole piece, armature and coil members.

Figure 1:
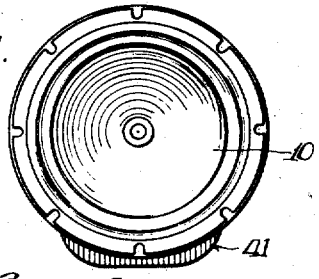
Fig. 1 is a front elevation of the completely assembled loudspeaker.
Figure 2:
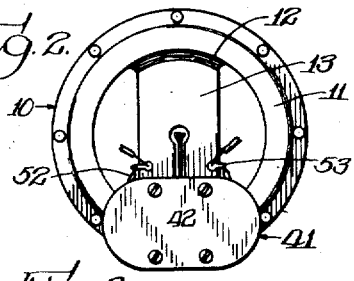
Fig. 2 is a rear elevation thereof.

In practicing my invention I provide a loudspeaker having a cone-shaped diaphragm supported on an annular frame, and a stylus extending rearwardly from the center of the cone. I provide a vibratory unit for the diaphragm to be mounted at the rear of the cone support and comprising a laminated permanent magnet including a plurality of closed ring magnets serving as a frame and having a central aperture to carry a pair of Y-shaped laminated pole pieces which in turn support a laminated armature and an encircling energizing coil intermediate said pole pieces. A driving arm extends from within the armature to the stylus on the diaphragm, and a non-magnetic housing is provided around the entire driving unit when assembled on the cone support.

Referring now to the drawings, in the loudspeaker of my invention I provide the usual cone-shaped diaphragm 10 supported on the annular rim of a frame 11, having a pair of rearwardly protruding legs 12 to carry a slotted mounting strip 13. The strip 13 is preferably welded to the legs 12 of the frame. A stylus 14 is rigidly secured at the apex of the cone to extend rearwardly through the mounting strip.

In addition to obtaining marked improvement in the faithfulness of reproduction and in the volume in the commercial embodiment of my speaker, as contrasted to those of the prior art, I have simplified the design and assembly of the vibratory unit of my speaker so as to materially reduce the complete cost of the same. Both material and labor costs have been reduced by providing stamped parts readily assembled in the vibratory unit. Furthermore, a very sturdy unit is provided. In vibratory units for loudspeakers in use at the present time, the permanent magnet is of the horse-shoe type, forged from high carbon steel at a relatively high cost. I provide a permanent magnet comprising a pair of ring-shaped laminations 16 and 17 stamped from a suitable magnet steel preferably in the shape of a substantially oval ring with an elongated aperture in the center thereof. If I wish to increase the field strength I may employ four, or even more laminations in the permanent magnet, using an even-number so that they may be divided with an equal number on each side of the pole pieces as will be hereinafter described. In a commercial embodiment I have stamped the laminations from steel strips or sheet steel ⅛ inch thick in which the steel is soft enough to permit stamping, but hard enough to provide the necessary retentivity value. The individual laminations of the magnet are assembled as shown particularly in Figs. 6 and 7 to serve as a frame on the inside and outside of a pair of Y-shaped laminated pole pieces 18 and 19 including a plurality of laminations with extending legs 21 on an integral tail piece 22. A pair of apertures 23 in the tail portion 22 of each of the laminations of the pole pieces provide holes the length of the pole pieces to receive fastening rivets 20.

The individual laminations of the pole pieces 18 and 19 are preferably stamped from relatively thin silicon steel, and with the retaining rivets extending only through the tail portion of the laminations there might be a tendency for the legs 21 to spread slightly in a longitudinal direction. To overcome this difficulty I provide silicon steel laminations over the central portion indicated by the letter A and steel laminations of greater thickness at each end as designated by the letter B. This assembly is also indicated by darker and lighter portions in the pole pieces of Fig. 8. The steel laminations are of sufficient rigidity to prevent the longitudinal spreading of the legs of the intermediate silicon steel laminations when secured together by the rivets.

A laminated armature 24 is provided for mounting between the pole pieces and includes a thin knife-edge driving arm 26 having a right-angled extension 27 of the same area as the laminations for the armature, so that the arm may be fitted into the center of the armature in the vertical plane of the stylus 14, to move as an integral portion of the armature. Apertures 28 are provided in each of the armature laminations as well as in the extension 27 to receive retaining rivets to hold the laminations of the armature together. A central aperture 29 is also provided to receive a mounting spring 31 extending the entire length thereof and protruding a short distance from each end thereof. The mounting spring is preferably a phosphor bronze alloy, although other materials with the necessary flexibility and strength may also be employed. The mounting spring must of course be stiff enough to insure a faithful movement in response to a variation in impulses applied, and stiff enough so that the armature won't hit against the pole pieces in vibrating.

As will be noted from a consideration of Figs. 6 and 7, the armature rocks about the mounting spring 31 as a central axis, although the only twisting of the spring that actually occurs is that between the portion soldered to the armature and the torsion blocks, as will be hereinafter explained. The mounting spring, of course, is rigidly soldered into the central aperture 29 so there is no relative movement as between the spring and the armature body itself at such soldered portion. Torsion or mounting blocks 32 of a non-magnetic metal fit over the ends of the spring 31 and are slightly spaced away from each end of the armature body itself to permit vibration of the armature itself, and spaced far enough away so that the block may be soldered to the end of the spring without danger of soldering the block to the end laminations of the armature. The torsion blocks are rigidly secured between the ends of the legs 21 on the pole pieces and are initially alined by means of notched portions 33 on each of the four corners of each of the blocks 32 to correspond with the ends of the legs 21. The torsion blocks are of such a size that when the armature is mounted between the pole pieces, an air gap 34 is provided between the armature and the ends of the pole pieces preferably of .005 inch. From the standpoint of sensitivity it is of course important to keep this as small as possible. However, I have obtained satisfactory operation with an air gap varying from .004 to .007 inch for instance.

Figure 3:
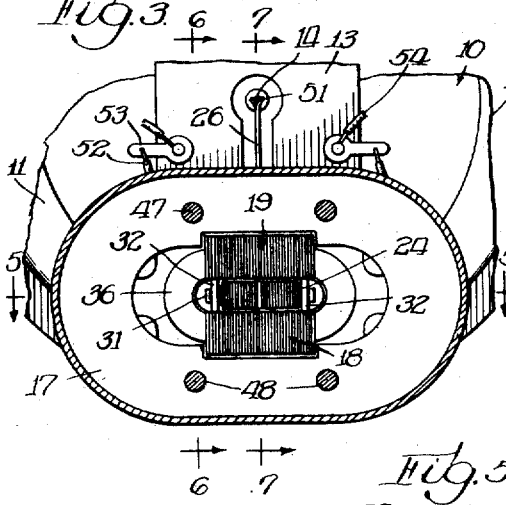
Fig. 3 is a fragmentary rear elevation partly in section of the vibratory or driving unit for the speaker.
Figure 4:
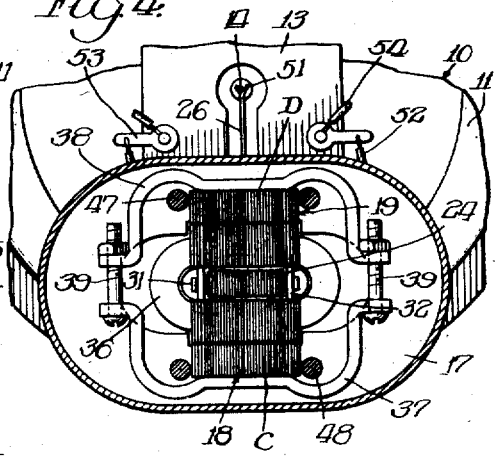
Fig. 4 is a similar view to that of Fig. 3, showing in addition a bi-part clamp for rigidly clamping the pole pieces outside the armature.

The channel between the legs 21 of the pole pieces is of such a size as to receive the frame of an energizing coil 36. The energizing coil has a central elongated aperture wide enough to permit the insertion of the torsion blocks 32 as shown particularly in Figs. 3 and 4 and preferably of such a width that the projections 30 on the blocks will engage the inner insulating ring 35 on the coil when the pole pieces, armature and coil are clamped together. The energizing coil is wound with any desired wire in the usual manner.

To assure a rigid assembly of the pole pieces, armature and energizing coil, I employ a bipart spring clamp including a pair of clamping members 37 and 38 bent to engage the top of the tail portion of the pole pieces at C and D and rounded out at the corners to remain out of engagement with mounting screws for the entire driving unit as will be hereinafter described. The ends of the clamping members are bent outwardly and apertured in the usual manner to receive bolts 39 of non-magnetic material and preferably brass. Upon tightening the clamp bolts, the ends of the legs of the pole pieces engage the torsion blocks so tightly that there is no possibility of looseness or chattering with resultant loss in efficiency in the speaker. The clamp also of course reinforces the natural magnetic attraction between the two pole pieces of opposite polarity. Mechanically, this assembly of the torsion blocks rigidly secured between the pole pieces provides in effect a solid one-piece mounting for the armature. The armature is the only member which can move, and as impulses are applied to the coil the armature rocks under repulsion or attraction of poles of like or opposite polarity, twisting the mounting spring therewith.

Figure 5:
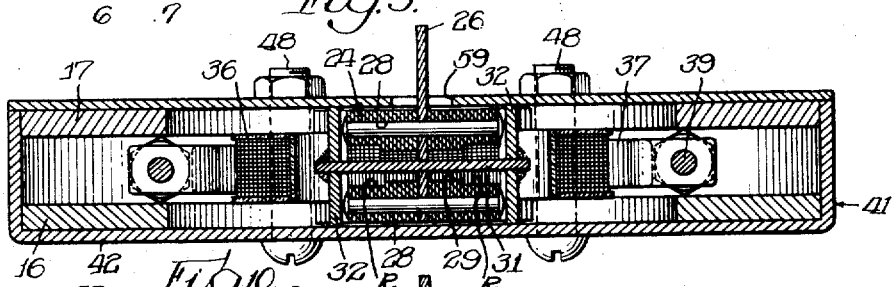
Fig. 5 is a sectional view of the driving unit along the line 5—5 of Fig. 3.

A very rapid and simple assembly of the entire unit is provided in first assembling the laminated pole pieces and laminated armature with the driving arm therein. The central aperture 29 in the armature formed by the various apertures in each of the laminations is of a diameter approximately the width of the phosphor bronze mounting spring 31. This aperture is reamed out at its ends R as shown in Fig. 5 to a depth of approximately ¼ inch. The spring 31 is then inserted into the aperture, a drop of acid as flux is placed in the aperture, and the armature dipped into a solder bath to rigidly solder the spring into the armature body. Any excess solder is wiped off and the torsion blocks 32 are fitted over the ends of the spring, spaced away from the laminations of the armature. The springs are then soldered to the block on the outside thereof. After the field coil 36 is inserted between the legs of the pole pieces the armature is placed in the central aperture of the coil and properly alined by means of the alining notches 33. The clamp is then positioned and drawn up to a tight engagement around the pole pieces. A jig is employed for aligning the elements of the assembly.

To prevent dust, dirt or moisture from getting into the driving unit, I provide a non-magnetic housing 41 including a closed cap 42 and a bottom member 43. To complete the assembly of the vibratory unit, the motor assembly comprising the pole piece, armature, and coil, clamped together by the bi-part clamp, is positioned between the two laminations 16 and 17 of the permanent magnet with the shoulders 44 on the pole pieces fitting into the alining notches 46 in the laminations. The cap 42 is then placed over this assembly and the bottom member 43 properly positioned, after which this assembly is mounted on the mounting strip 13 by bolts 47. A pair of bolts 48 are inserted through the necessary apertures in the lower portion of the assembly to hold the members of the permanent magnet together over the pole pieces and close the housing over the entire driving unit. In the meantime the split end 51 of the driving arm has been placed over the stylus 14 and when soldered thereto completes the assembly of the driving unit on the cone support. Suitable wire leads 52 extend from the field coil 36 to be soldered to mounting posts 53 eyeletted onto the mounting strip 13. Lead wires 54 then extend from the eyelets to the radio receiver.

Inasmuch as dirt and moisture, collecting in the air gap would impair the operating efficiency, it is very desirable to employ the cap 42 and bottom plate 43 to house the unit. It is understood, however, that the vibratory unit may, if preferred, be mounted directly on the cone support with the bolts 47 and 48 as described.

Figure 10:
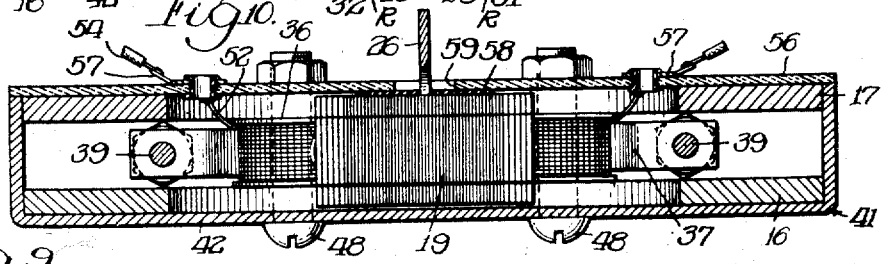
Fig. 10 illustrates a modification of the closing plate for the vibratory unit housing.
Figure 9:
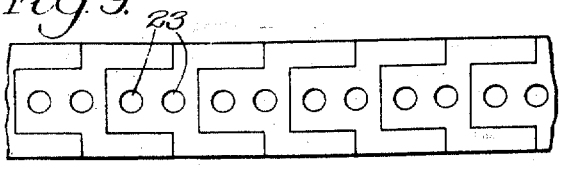
Fig. 9 is a top elevation showing the manner in which the laminations of the pole pieces are stamped out of a single strip of steel with a minimum of waste in the strip.

A modification of the bottom member of the housing is illustrated in Fig. 10, wherein a fiber insulating strip 56 is assembled in the same manner as the member 43. I also utilize the member 56 as a terminal strip by eyeletting a pair of terminal lugs 57 thereon. The wire leads 52 are brought to the eyelets and soldered thereto, and the wire leads 54 from the receiver are soldered onto the terminal lugs 57, thus eliminating the lugs 53.

To further protect the vibratory unit against moisture and dirt when employing a housing, I slit a piece of thin surgical rubber 58 and slip it over the driving arm before the unit is placed against the bottom member of the housing. This effectively closes the aperture 59 in the bottom member through which the arm extends.

In providing punched-out laminations for the permanent magnet, and stampings for most of the remaining parts of the vibratory unit, an inexpensive unit is provided, and at the same time a very sturdy one. The various parts of the unit are very simple, and due to their design may be very readily assembled. It is possible to ship the unit disassembled to its place of use, and there to be very quickly and cheaply assembled. The vibratory unit is exceedingly sturdy and capable of long and efficient use. In the commercial embodiment of the invention I obtain marked improvement in reproduction over the entire frequency range, and a large increase in volume over the magnetic type speakers in use at the present time.

Although I have described my invention in its preferred embodiments, it is understood that I am not limited thereby, but limit the invention only by the scope of the appended claims.

I claim:

1. A vibratory unit for a magnetic speaker, including a motor assembly having a pair of pole pieces, an armature supported for oscillatory vibration between the pole pieces and having a driving member in connection therewith, means for retaining said pole pieces and armature in fixed relation, and a plurality of permanent magnets including a continuous, flat, apertured magnet on each of two sides of the pole piece armature assembly engaging the pole pieces, and of such a size and shape as to extend considerably beyond the edge of the assembly in opposite directions, and positioned at right angles to the line of movement of said driving member to serve as a mounting frame for the pole piece armature assembly.

2. A vibratory unit for a loudspeaker comprising a motor assembly including a pair of oppositely disposed pole pieces, an armature mounted for oscillatory vibration between said pole pieces in a manner to form an air gap therebetween, said armature having mounting means in abutment with the active faces of said pole pieces, a spring clamp engaging the outside edge of each of the pole pieces to draw the pole pieces toward the armature, to maintain said armature in fixed mounting position therebetween, and a permanent magnet mounted on said motor assembly as an assembling frame therefor.

3. A vibratory unit for a loudspeaker including a pair of oppositely positioned Y-shaped pole pieces each having a pair of forwardly extending legs with a channel therebetween, a tail portion extending rearwardly from the channel and of the same size as said channel, an energizing coil carried in the oppositely positioned channels, an armature supported between the pole pieces and within the field coil, a permanent magnet comprising a plurality of ring-shaped members with a member resting on one side of each pole piece tail, and another member resting on the other side of each pole piece tail.

4. A vibratory unit for a loudspeaker comprising a permanent magnet, a vibrating armature, a laminated pole piece on each of two sides of said armature, each of said pole pieces comprising a plurality of relatively thin Y-shaped laminations having a pair of forwardly extending legs defining a channel therebetween and a tail piece extending rearwardly from the leg portion and of substantially the same size as said channel, a retaining rivet through said tail pieces, and means for preventing a longitudinal spread of the pole piece at the leg portions, said means comprising relatively heavy laminations assembled at each end of the relatively light lamination assembly with said heavy laminations having greater rigidity than said relatively light laminations.

5. A loudspeaker motor including an armature, a spindle rigidly secured to said armature, holders carrying said spindle and positioned adjacent to said armature but being slightly wider than said armature, a pair of pole pieces having their active faces bearing against opposite sides of said holders and accurately spaced by said holders to permit operation of the armature therein, and means for supporting said pole pieces and supplying magnetic flux thereto.

6. A loudspeaker motor including an armature, separate pole pieces positioned on opposite sides of said armature with end faces toward said armature, and a centrally apertured ring-shaped permanent magnet engaging a side face at right angles to an end face of each of said pole pieces whereby it may firmly engage both of said pole pieces irrespective of their exact dimensions and fit in the vertical direction through the two pole pieces and armature, said pole pieces being laminated, and means being provided for clamping all of the laminations of the pole pieces against said magnet to insure their proper vertical alinement.

7. A vibratory unit for a loudspeaker including a pair of oppositely positioned laminated pole pieces, each including a plurality of Y-shaped laminations with a pair of forwardly extending legs having a channel therebetween and a tail portion extending rearwardly from the channel, an energizing coil, and an armature supported between the pole pieces, and a ring-shaped permanent magnet in engagement with the pole pieces on the tail portion thereof.

8. In a vibratory unit for a loudspeaker, an armature unit comprising a pair of spaced apart non-magnetic stationary torsion blocks, a supporting spring rigidly secured at its ends at the blocks, an armature member rigidly secured on said spring with the latter extending through the longitudinal center of the member from end to end, said member comprising a plurality of laminations with a one-piece diaphragm driving element positioned in said member intermediate the ends thereof and having a body portion conforming in shape precisely to the laminations in said member, with an integral elongated driving arm, flat and of the same thickness as the body portion extending away from said body portion in said armature and at right angles thereto for connection with the diaphragm.

9. A vibratory unit for a loudspeaker including a vibratory armature comprising a plurality of apertured laminations, a diaphragm driving member having an apertured body portion conforming in shape to said laminations and positioned corresponding thereto in said armature intermediate the ends thereof and a knife-edge elongated driving arm extending away from the body portion in the plane of said body portion and integral therewith, and a mounting spring for the armature extending through the aperture in each lamination and the aperture in the body portion of the driving member, with said mounting spring being rigid over at least a portion thereof with respect to the laminations and driving member.

10. A vibratory unit for a loudspeaker including a pair of oppositely positioned Y-shaped pole-pieces each having a pair of forward legs and a tail portion, an apertured energizing coil carried in the recess formed by the legs of the pole-pieces, an armature in the aperture of the coil having supporting means carried by the pole pieces, and an apertured permanent magnet carried on a corresponding face of each of the tail portions with a portion of each pole-piece extending into the magnet aperture.

11. A vibratory unit for a loudspeaker including a pair of Y-shaped block-like pole-pieces, each having a pair of forwardly extending legs and a tail portion, with said pole-pieces positioned with the legs facing each other, an energizing coil carried in the oppositely disposed recesses in the pole-pieces formed by the legs, and an armature within the energizing coil having a stationary carrying plate at each end supported by the active faces of the pole-pieces, and a closed substantially oval shaped permanent magnet resting on a corresponding side of each of the tail portions of the pole-pieces, with a corresponding forward leg of each pole-piece lying in the aperture of the magnet and acting with the magnet to position the pole-pieces with respect to one another and the armature plate therebetween.

12. A vibratory unit for a loudspeaker including an apertured plate-like permanent magnet, a vibratory armature, and a pair of block-like Y-shaped pole-pieces supporting the armature therebetween, each pole-piece having a recess on at least one side of the tail portion corresponding in depth substantially to the thickness of the permanent magnet with the recesses on corresponding sides of the two tail portions, and said permanent magnet lying on the tail portions at the corresponding recesses with the forward leg on said recess side of each pole-piece positioned in the magnet aperture.

13. A vibratory unit for a loudspeaker including a pair of spaced apart pole-pieces with the active face of each pole-piece oppositely disposed from the other, a pair of spaced apart non-magnetic plates between the active faces of the pole-pieces and supported solely by engagement with said faces, a block-like armature between said pole-pieces and said plates, a spindle irremovably secured to said plates and extending through the armature in the longitudinal axis thereof to support the same for vibratory movement, and a permanent magnet resting upon a corresponding outside face of each pole-piece with such outside faces at right angles to the active faces of the pole-pieces, and said magnet acting to position said pole-piece-armature assembly elements with respect to one another and acting as a mounting frame for the vibratory unit.

14. A vibratory unit for a loudspeaker comprising a pair of oppositely disposed single unit pole-pieces, a laminated armature mounted between the pole-pieces for oscillatory vibration, means for supporting said armature comprising a stationary torsion block at each end thereof retained between the pole-pieces in engagement with the active faces thereof, a mounting spring irremovably secured at each end in a torsion block and extending through the armature in the longitudinal axis thereof in a line at right angles to the line of movement of the diaphragm of the loudspeaker.

15. An electromagnetic loudspeaker motor including a continuous oval shaped permanent magnet having an elongated central aperture, a pair of opposed pole-pieces positioned against one face of the magnet with each pole-piece having a portion extending into the aperture of the magnet to position said pole-pieces with respect to said magnet, and a clamp around the pole-pieces on an outside face of each at right angles to the magnet engaging face to draw the pole-pieces toward one another.

16. An electromagnetic loudspeaker motor having a pair of opposed pole-pieces, an armature unit retained by the pole-pieces between the active faces thereof, a permanent magnet for the pole-pieces, and a spring clamp around said pole-pieces engaging an outside face of each parallel to the active face of that pole-piece and adapted to be adjustably tightened to draw the pole-pieces toward one another to rigidly retain the armature unit therebetween.

17. A loudspeaker motor including an armature, a spindle rigidly secured to said armature, apertured holders carrying said spindle in the apertures thereof and positioned adjacent to said armature but being slightly wider than said armature, a pair of pole pieces having their active faces bearing against opposite sides of said holders and with said faces accurately spaced by said holders to permit operation of the armature therebetween, and with said armature being spaced with reference to said pole faces to form an air gap therebetween and said spacing being maintained as a result of said armature spindle being carried by said holders and said holders spacing said faces, and means for supporting said pole pieces and supplying magnetic flux thereto.

18. A loudspeaker motor including an armature, a spindle rigidly secured to said armature and serving as an axis therefor in the vibratory movement of the armature, holders carrying said spindle and positioned adjacent to said armature but being slightly wider than said armature, a pair of pole pieces having their active faces bearing against opposite sides of said holders and accurately spaced by said holders whereby to be spaced relative to said armature to provide air gaps between said armature and pole faces and permit operation of the armature therein, a coil unit including insulating means extending around said armature and said holders but spaced from said armature with the holders preventing said insulating means from engaging the armature, and means for supporting said pole pieces and supplying magnetic flux thereto.

19. A vibratory unit for a loudspeaker comprising a pair of oppositely disposed pole-pieces each having a pole face thereon, a laminated armature mounted between the pole-faces for oscillatory vibration, means for supporting said armature comprising a stationary torsion block at each end thereof retained between said faces of the pole-pieces in engagement therewith, a mounting spring irremovably secured at each end in a torsion block and extending through the armature in the longitudinal axis thereof in a line at right angles to the line of movement of the diaphragm of the loudspeaker, with said torsion blocks alone determining the spacing between said pole faces and likewise determining the air gap between the armature and pole faces.

20. An electromagnetic loudspeaker motor having a pair of opposed pole-pieces, an armature unit retained by the pole-pieces between the active faces thereof, a permanent magnet for the pole-pieces, and spring clamp means for said pole-pieces including a pair of members with each member engaging an outside face of each pole piece parallel to the active face of that pole-piece, and means operatively connected to each member and adjustable to provide relative movement therebetween to draw the pole-pieces toward one another to rigidly retain the armature unit therebetween.

21. An electromagnetic loudspeaker motor having a pair of opposed pole-pieces, an armature unit retained by the pole-pieces between the active faces thereof including an armature and armature supporting means at each end of said armature positioned between the active pole faces to determine the spacing between the active faces and the spacing between the armature and each adjacent active pole face, a permanent magnet for the pole-pieces, and a clamp around said pole-pieces including a pair of members with each member engaging an outside face of each pole piece parallel to the active face of that pole-piece, and means to move one member relative to the other to adjustably tighten the clamp and draw the pole-pieces toward one another to rigidly retain the armature unit therebetween.

22. A vibratory unit for a loudspeaker including in combination a pair of oppositely disposed single unit pole-pieces, each pole piece having a pair of legs with a channel therebetween and an active pole face at the bottom of the legs, a laminated armature positioned between the active pole faces having driving means for the loudspeaker thereon, and means for supporting said armature in such position comprising a stationary torsion block at each end of said armature retained between the pole pieces, and each torsion block having oppositely disposed recessed portions engaging the corresponding active pole faces and an extension between each two recessed portions extending into the corresponding pole-piece channel, and a mounting spring irremovably secured at each end in a torsion block and extending through the armature in the longitudinal axis thereof in a line at right angles to the line of movement of the driving means on the armature.

23. A loudspeaker motor including a movable armature, a spindle rigidly secured to said armature, holders carrying said spindle and positioned adjacent to said armature but being slightly wider than said armature, an energizing coil surrounding said armature and holders and maintained out of physical contact with said movable armature by the width of said holders, a pair of pole pieces having active faces bearing against opposite sides of said holders and spaced apart accurately and solely by said holders to permit operation of the armature therebetween, and means for supporting said pole pieces and supplying magnetic flux thereto.

JAMES P. QUAM.